N. RIPPENBEIN.
AEROPLANE.
APPLICATION FILED SEPT. 5, 1917.
1,309,961.
Patented July 15, 1919.
3 SHEETS—SHEET 1.
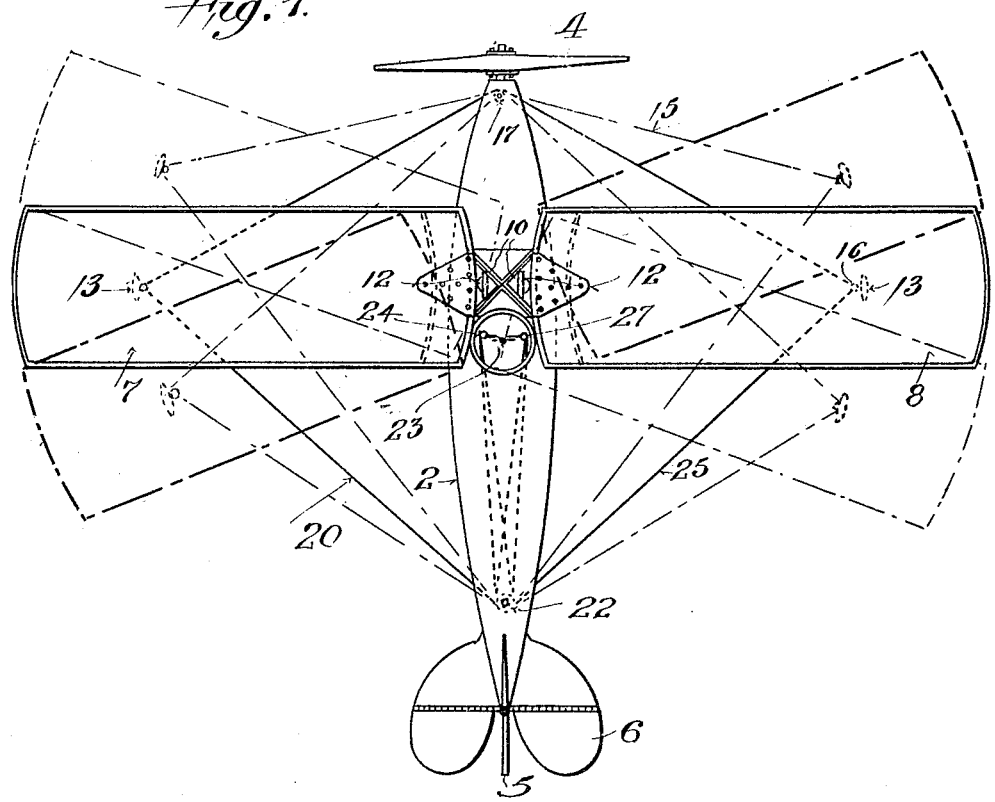
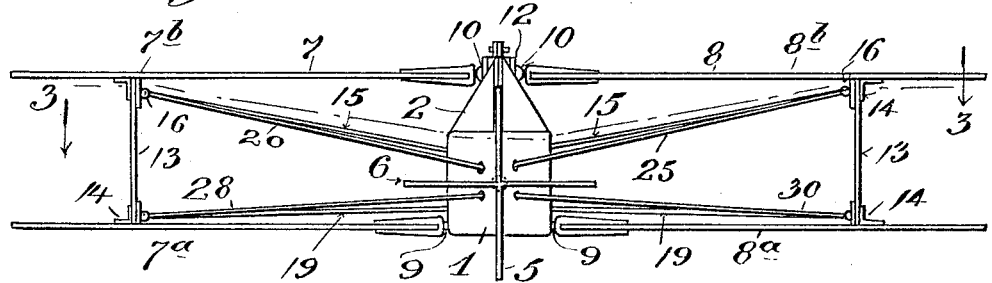
Inventor
Nicholas Rippenbein
by his atty T. F. Bourne

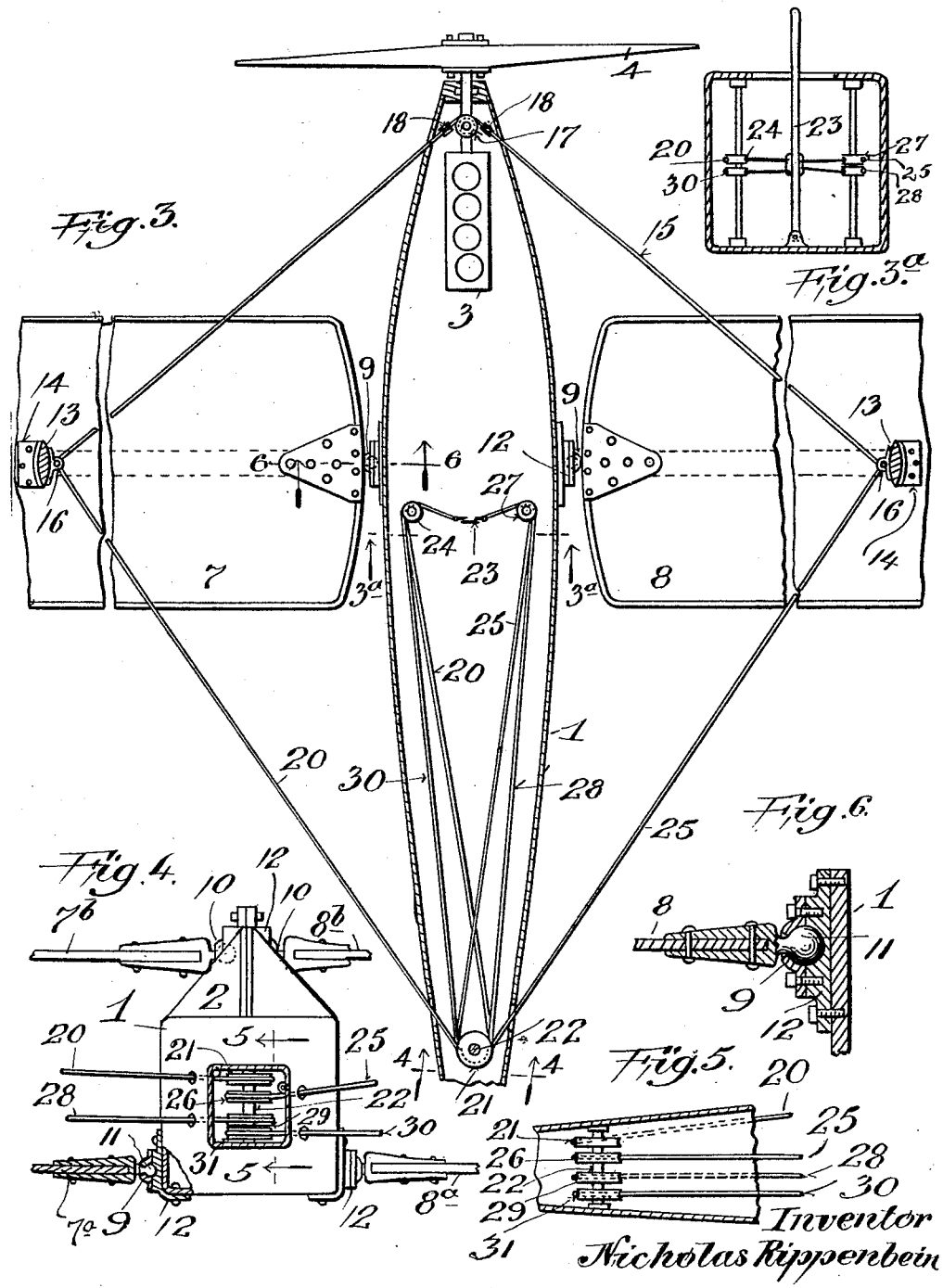

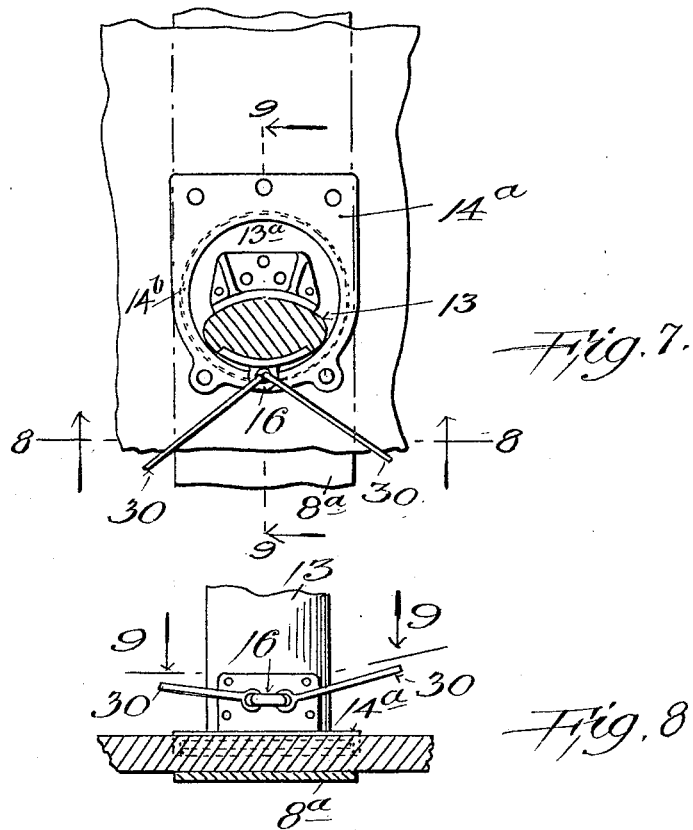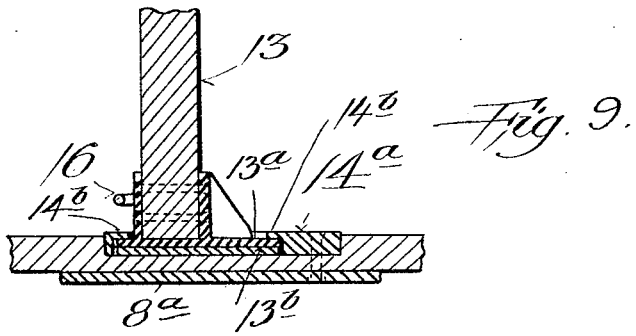

UNITED STATES PATENT OFFICE.

NICHOLAS RIPPENBEIN, OF PERTH AMBOY, NEW JERSEY.

AEROPLANE.

1,309,961. Specification of Letters Patent. Patented July 15, 1919.

Application filed September 5, 1917. Serial No. 189,743.

*To all whom it may concern:*

Be it known that I, NICHOLAS RIPPENBEIN, a citizen of the United States, and resident of Perth Amboy, in the county of Middlesex and State of New Jersey, have invented certain new and useful Improvements in Aeroplanes, of which the following is a specification.

The object of my invention is to provide means whereby a wing or wings of an aeroplane may, at will, be moved bodily forwardly or rearwardly and tilted in an upward or downward direction to vary the angle thereof with respect to the line of flight during flight, thus enabling the angle of incidence or sustaining angle of the wing or wings to be changed by the aviator as circumstances may require, whereby to attain power and accuracy of lateral control of the machine without straining the component parts of the wings, and without causing the machine to veer excessively about its vertical axis while balancing laterally.

My invention comprises novel details of improvement and combinations of parts that will be more fully hereinafter set forth and then pointed out in the claims.

Reference is to be had to the accompanying drawings forming part hereof, wherein, Figure 1 is a plan view of an aeroplane embodying my invention; Fig. 2 is a rear end view thereof; Fig. 3 is an enlarged horizontal section substantially on the line 3, 3, in Fig. 2; Fig. 3$^a$ is a cross section on the line 3$^a$, 3$^a$ in Fig. 3; Fig. 4 is a section substantially on the line 4, 4, in Fig. 3, also partly in section at the plane of the line 6, 6, in said figure; Fig. 5 is a section on the line 5, 5, in Fig. 4; Fig. 6 is an enlarged detail section on the line 6, 6, in Fig. 3; Fig. 7 is an enlarged detail sectional view of part of Fig. 3; Fig. 8 is a section on the line 8, 8, in Fig. 7, and Fig. 9 is a section on the line 9, 9, in Fig. 7.

Similar numerals of reference indicate corresponding parts in the several views.

At 1 is indicated a fuselage and at 2 is a cabane, which may be of any well known or suitable construction. An engine is indicated at 3 in the fuselage and a propeller at 4, in a wellknown manner. The rudder 5 and elevator 6 may be attached to the fuselage and operated in any wellknown manner. The main wings are indicated at 7, 8, extending from opposite sides of the fuselage. They are shown as bi-planes in Figs. 1 to 6, although my improvements may be utilized in conjunction with monoplanes, or multiplanes. Referring first to Figs. 1 to 6, at their inner ends the said wings are pivotally connected with the fuselage. Where a cabane is used with a bi-plane or the like the lower wings 7$^a$, 8$^a$ may be pivotally connected with the fuselage, as at 9, and the upper wings 7$^b$, 8$^b$ may be pivotally connected with the cabane, as at 10. The pivotal connections 9, 10 are shown disposed centrally with respect to the longitudinal axes of the wings, and are of universal form so that the wings may assume different positions relatively to the fuselage. I have shown a ball-member 11 secured to and projecting from the inner end of the wing and received in a socket member 12 secured on the fuselage and the cabane respectively. The respective pairs of wings 7$^a$, 7$^b$ and 8$^a$, 8$^b$ and united together by struts at points suitably near their outer ends, say approximately one-third (more or less) their length measured from their outer ends or tips. For such purpose I have shown struts 13 interposed between the pairs of wings and attached thereto at 14. At least at one end of each strut 13 the same may be connected to the corresponding wing in such a manner that the strut may have axial rotation relatively to such wing, as illustrated in Figs. 7, 8 and 9, wherein strut 13 is provided with a flange 13$^a$ rotatively fitted in a keeper or plate 14$^a$ secured upon the adjacent wing, the keeper 14$^a$ having a web 14$^b$ overlying the flange 13$^a$. A metal disk or washer is shown at 13$^b$ upon which the flange 13$^a$ rotates, said disk or washer taking thrust from strut 13. I provide means for at will causing the pairs of wings to turn to a desired extent from their normal relation to the fuselage and to their normal angles of incidence or sustaining angles as well as to deviate slightly from their normal rectangular relation to the longitudinal axis of the fuselage. For such purpose I provide wires or ropes that are connected with the struts 13 and with the fuselage as follows: Wire or rope 15 is secured at its ends to the upper ends of struts 13, as at 16, and its mid-portion passes over a pulley 17 suitably journaled in or on the fuselage at its forward end, idle pulleys 18 journaled in or on the fuselage guiding the wire or rope at said pulley. A similarly arranged wire or rope 19 (Fig. 2) is secured at its ends to the lower ends of struts 13, the mid-portion of said wire or rope passing over pulleys similar to those described at 17, 18 in or on the fuselage and below the said pulleys. The wires or ropes 15 and 19 brace the wings to the forward part of the fuselage and travel on the respective pulleys as required according to adjustment of the wings, permitting the upper and lower wings to have turning or forward and rearward, as well as inward, adjustment while always maintaining the bracing effect with respect to the fuselage. A wire or rope 20 is secured at 16 to the upper part of lefthand strut 13 (Fig. 2) and passes through a hole in the fuselage to and over a pulley 21 journaled upon a post or rod 22 secured in the fuselage at or near its rear portion (Figs. 4 and 5), said wire passing from said pulley to a lever 23 that is pivoted at its lower end in the fuselage, an idle pulley 24 in the fuselage guiding said wire to the lever 23 (Fig. 3). A wire or rope 25 is secured to the upper part of the right hand strut 13 and passes thence through a hole in the fuselage around a pulley 26 journaled on post 22, said wire passing from said pulley around an idle pulley 27 in the fuselage, the adjacent end of the wire being secured to lever 23. It will be seen that pulleys 24 and 27 are located on opposite sides of lever 23. A third wire or rope 28 is secured to the lower end of the left-hand strut 13 (Fig. 2) and passes through a hole in the fuselage around a pulley 29 on post 22 (Figs. 4 and 5) said wire passing from pulley 29 around a pulley corresponding to pulley 27 to lever 23, being secured to the lever on the side opposite wire 20. A fourth wire 30 is secured at one end to the lower end of the righthand strut 13 and passes thence around a pulley 31 journaled on post 22 whence said wire passes around an idle pulley corresponding to pulley 24 to lever 23, being secured to the lever on the side opposite wire 25. Since lever 23 is vertically disposed between pulleys 24 and 27 its movements to the left or right will cause operation of the aforesaid wires or ropes to effect desired operation of the wings relatively to the fuselage and to the line of flight of the machine.

When lever 23 is in its normal or central vertical position the wings will all be maintained in the normal positions with reference to the fuselage and the line of flight, the wings then having any suitable upward angle relatively to the fuselage or line of flight. If the lever 23 be moved to the left or the righthand side the wires or ropes will be operated in such a manner that the upper wing on one side of the fuselage will be caused to describe a forward, downward, and inward path and the corresponding lower wing on the same side will describe a backward, upward and inward path, with regard to the line of flight, while the upper wing on the opposite side will be caused to describe a rearward, downward and inward path and the corresponding lower wing will describe a forward, upward and inward path with regard to the line of flight, such movements of said wings being caused and controlled by reason of the struts 13 between the pairs of wings and the pivotal connection of the wings with the fuselage, and by reason of the axial rotation of strut 13 with respect to the corresponding wing to which it is pivotally secured. The arrangement shown in Figs. 7, 8 and 9, while permitting such pivotal action of strut 13 with respect to such wing, maintains parallelism between the upper and lower wings in different positions of adjustment of one relatively to another. For instance, if lever 23 be moved to the left in Fig. 1 the wires 25 and 28 will be pulled, whereupon the upper part of strut 13 of the righthand wings will be pulled rearwardly and the lower part of strut 13 of the lefthand wings will be pulled rearwardly while the wires 20 and 30 will give slack, and at the same time the righthand strut at its upper part will pull the wire 15 which in turn will pull the upper part of the lefthand strut 13 forwardly, while the aforesaid rearward movement of the lower part of the lefthand post 13 will pull on the wire 19 causing the lower part of the righthand strut 13 to be pulled forwardly. The result will be that the two wings on the lefthand side will be tilted downwardly at their forward edges, the top wing $7^b$ moving forwardly, and the lower wing $7^a$ moving rearwardly, and the two wings on the righthand side will be moved reversely, that is to say, their forward edges will be tilted upwardly, the top wing $8^b$ moving rearwardly and the lower wing $8^a$ moving forwardly. If the lever 23 be moved to the right in Fig. 1, the wires 20 and 30 will be pulled and the wires 25 and 28 will give slack, the wire 20 pulling the upper end of lefthand strut rearwardly to tilt upwardly the forward edge of top wing $7^b$ and to move said wing rearwardly while the wire 30 will pull the lower end of righthand strut 13 rearwardly to tilt the forward edge of said wing downwardly and to move said wing rearwardly. The lefthand strut at its upper end will pull wire 15 which will pull the upper part of righthand strut 13 forwardly to tilt the forward edge of top wing $8^b$ downwardly and move said wing forwardly while the lower end of righthand strut 13 will pull wire 19 which will pull the lower end of lefthand strut 13 forwardly to cause tilting upwardly of the forward edge of lower wing 7ª and the forward movement of said wing. In accordance with the extent of movement of lever 23, to the left or to the right, the wings will be moved, with regard to deviation from their normal positions required according to the necessities of flight at any given time.

My improvements afford an advantageous and effective means of control of the aeroplane, and more satisfactory in respect to head resistance than one having warped wing tips or pivoted ailerons, because the entire movably supported main wing is caused to increase or decrease its sustaining angle. The slight forward motion of one wing and the slight rearward motion of the other wing on the same side of the machine, (with the reverse movements of the corresponding wings on the opposite side when the plural wings on both sides are used), and similar movements of the main wing or wings in a monoplane, serve to maintain an angle properly proportioned to the angle required for the best result in maintaining the lateral equilibrium of the machine at a given time. The angles of the wings may be maintained always reasonably close to the normal sustaining angle of flight, thereby lessening undesirable gross and differential drag that would be liable to ensue were the wing tips warped, as in conventional aeroplanes, thus avoiding inefficient angles of attack in controlling lateral equilibrium. A firm construction in the wings themselves is effected because the entire wing may be made and kept perfectly rigid throughout without warping a portion thereof, thereby obviating relative movements of component parts of the wing. Considerable reduction in head resistance is effected by my invention because the control wires referred to serve also as bracing or guy wires between the movable wing or wings and the fuselage, and customary control wires for warping the wing tips or for operating hinged wing tips in addition to ordinary bracing or guy wires, as in conventional areoplanes, are dispensed with. It will be understood, of course, that any desired bracing or guy wires may be provided between the movable wings and the fuselage or cabane, if desired.

My invention differs in construction, means of control of the wing or wings, and mode of operation thereof, from the class of aeroplanes wherein the wings are merely rotated on their longitudinal axes without forward or rearward movement, or where wings are given a forward or rearward movement without tilting axially to vary the angle of incidence, since the movable wing or wings in my areoplane have combined forward or rearward inward and tilting movements (either upward or downward in the direction of flight), serving to restore or maintain the lateral equilibrium of the machine as occasion may require.

While I have set forth the wings as being universally pivoted to the fuselage or to the latter and the cabane, it will be understood that the wing or wings may be pivoted to any other suitable fixed part of the machine with respect to the power plant or line of flight.

Other necessary and usual parts and equipment customarily employed in aeroplanes may be provided in connection with my improvements as may be desired.

Having now described my invention what I claim is:—

1. An aeroplane having a plurality of wings pivotally supported arranged in pairs on opposite sides of a fixed portion of the machine, a strut between each pair of wings spaced from the corresponding pivotal support and having axial movement relative to the wings, and means to cause the wings on one side to swing fore and aft oppositely and all to tilt axially to vary the angle of incidence in one direction with respect to the direction of flight and to cause the wings on the other side to swing fore and aft oppositely and all to tilt axially reversely to the tilting of the wings on the first named side with respect to the direction of flight.

2. An aeroplane having a pair of wings pivotally supported on each side of a fixed portion of the machine, a strut uniting the wings of each pair together at a point distant from their pivotal points, and means to cause an upper and a lower wing on opposite sides to swing forwardly and an upper and a lower wing on opposite sides to swing rearwardly with respect to the direction of flight and to cause both wings on one side to tilt axially in one direction and both wings on the other side to tilt axially in a reverse direction.

3. An aeroplane having a fuselage, a pair of wings pivotally supported on each side of the fuselage, struts uniting wings of said pairs at points distant from their pivotal supports, wires connecting the upper wings together and the lower wings together, retaining means on the fuselage for said wires located on one side of the longitudinal axes of said wings, wires connected to the upper and the lower wings of each pair, guiding means for said wires located on the other side of the longitudinal axes of said wings, and means to operate said wires in directions to cause appropriate forward and rearward and tilting movements of said wings.

4. An aeroplane having a fuselage, wings attached to the fuselage and extending in opposite directions therefrom, a wing on one side of the fuselage being pivotally connected therewith to swing fore and aft from a normal transverse position and to tilt axially to vary the angle of incidence, operating wires connected with the pivoted wing, guiding means on the fuselage for said wires, and means on the fuselage connected with said wires for operating them to cause said fore and aft and tilting movements of the wing with respect to the direction of flight.

Signed at New York city in the county of New York and State of New York this 31st day of August, A. D. 1917.

NICHOLAS RIPPENBEIN.

Copies of this patent may be obtained for five cents each, by addressing the "Commissioner of Patents, Washington, D. C."